Feb. 13, 1973 K. B. COMFORT 3,716,186

HEXADECIMAL SLIDE RULE

Filed Nov. 17, 1971

United States Patent Office 3,716,186
Patented Feb. 13, 1973

3,716,186
HEXADECIMAL SLIDE RULE

Kent B. Comfort, Tulsa, Okla., assignor to Mar-Com Development, Inc., Tulsa, Okla.

Filed Nov. 17, 1971, Ser. No. 199,495
Int. Cl. G06g *1/02*
U.S. Cl. 235—70 R 3 Claims

ABSTRACT OF THE DISCLOSURE

Disclosed herein is a method for the rapid addition and/or subtraction computation of higher order mathematics. The method is particularly applicable for alphameric manipulations, for example, for the operations of hexadecimal subtraction and addition.

In general, if a carry develops during hexadecimal addition, it is convenient to mentally add the one carry to the lower-valued of the two operands and then add to the other operand by the use of the addition table; the carry is then accounted for by going to the next square to the right or below the intersection that represents the sum of the digits, known as the conventional method. As an example of this use, to add the digits 7 plus C plus 1 (carry), one may add 7 plus 1 (carry) equals 8, and then look up the result of adding 8 (column) plus C (row) at the intersection of the 8-column and the C-row, which would show 14, found by the tabular method.

Alternatively, one can add 7 (column) plus C (row) by use of the table, finding 13 at the intersection; the 1 carry is then accounted for by going one square below (or to the right of) the intersection on the table, which again would yield 14 as the result, known as the paycheck method.

THE HEXADECIMAL SYSTEM

| | 1 | 2 | 3 | 4 | 5 | 6 | 7 | 8 | 9 | A | B | C | D | E | F | 10 |
|---|---|---|---|---|---|---|---|---|---|---|---|---|---|---|---|---|
| 1 | 02 | 03 | 04 | 05 | 06 | 07 | 08 | 09 | 0A | 0B | 0C | 0D | 0E | 0F | 10 | 11 |
| 2 | 03 | 04 | 05 | 06 | 07 | 08 | 09 | 0A | 0B | 0C | 0D | 0E | 0F | 10 | 11 | 12 |
| 3 | 04 | 05 | 06 | 07 | 08 | 09 | 0A | 0B | 0C | 0D | 0E | 0F | 10 | 11 | 12 | 13 |
| 4 | 05 | 06 | 07 | 08 | 09 | 0A | 0B | 0C | 0D | 0E | 0F | 10 | 11 | 12 | 13 | 14 |
| 5 | 06 | 07 | 08 | 09 | 0A | 0B | 0C | 0D | 0E | 0F | 10 | 11 | 12 | 13 | 14 | 15 |
| 6 | 07 | 08 | 09 | 0A | 0B | 0C | 0D | 0E | 0F | 10 | 11 | 12 | 13 | 14 | 15 | 16 |
| 7 | 08 | 09 | 0A | 0B | 0C | 0D | 0E | 0F | 10 | 11 | 12 | 13 | 14 | 15 | 16 | 17 |
| 8 | 09 | 0A | 0B | 0C | 0D | 0E | 0F | 10 | 11 | 12 | 13 | 14 | 15 | 16 | 17 | 18 |
| 9 | 0A | 0B | 0C | 0D | 0E | 0F | 10 | 11 | 12 | 13 | 14 | 15 | 16 | 17 | 18 | 19 |
| A | 0B | 0C | 0D | 0E | 0F | 10 | 11 | 12 | 13 | 14 | 15 | 16 | 17 | 18 | 19 | 1A |
| B | 0C | 0D | 0E | 0F | 10 | 11 | 12 | 13 | 14 | 15 | 16 | 17 | 18 | 19 | 1A | 1B |
| C | 0D | 0E | 0F | 10 | 11 | 12 | 13 | 14 | 15 | 16 | 17 | 18 | 19 | 1A | 1B | 1C |
| D | 0E | 0F | 10 | 11 | 12 | 13 | 14 | 15 | 16 | 17 | 18 | 19 | 1A | 1B | 1C | 1D |
| E | 0F | 10 | 11 | 12 | 13 | 14 | 15 | 16 | 17 | 18 | 19 | 1A | 1B | 1C | 1D | IE |
| F | 10 | 11 | 12 | 13 | 14 | 15 | 16 | 17 | 18 | 19 | 1A | 1B | 1C | 1D | 1E | 1F |
| 10 | 11 | 12 | 13 | 14 | 15 | 16 | 17 | 18 | 19 | 1A | 1B | 1C | 1D | 1E | 1F | 20 |

BACKGROUND OF THE INVENTION

The present invention provides a method for higher order alphameric subtraction and addition. More particularly, the method of the present invention provides a means wherein the rapid computation of hexadecimal addition and subtraction and other higher order alphameric mathematical systems may be accomplished.

The use of higher than decimal order addition and subtraction systems, for example a hexadecimal system, working with alphameric symbols, that is systems containing both numbers and letters, often appear strange to, and are difficult for, the manipulator. The growth of the hexadecimal system, especially in relation to the higher order computer languages, requires a particular degree of skill which must be met by reorientation and practice through use of the hexadecimal system. A table may be prepared for hexadecimal addition. As shown in the accompanying table, the abcissa delineates the numbers one through nine followed by the letters A, B, C, D, E, F and then number 10, with the ordinate being similarly disposed. The table allows cross additions for each example of use, having a total entry of two hundred fifty-six alphameric solutions. Although the use of the table is simple, one would not be expected to memorize such results, nor is the table readily suitable for the addition of higher order numbers represented by the alphameric system in that one must cross columns in order to utilize the tables for higher order addition.

It is readly depicted, therefore, that hexadecimal addition for higher order alphameric solutions is relatively complicated, even with the use of the alphameric table for aiding in the solution.

Hexadecimal subtraction follows the same rules as decimal and binary subtraction, with the improvision that a carry or borrow of one in a hexadecimal notation represents the number 16. The same table used for hexadecimal addition may also be used for the subtraction process. The alternate procedure is utilized to find the solution during subtraction. One locates the column heading that represents the digit to be subtracted, known as the subtrahend, then traverses down the column to the digit that represents the minuend and looks at the heading of the row horizontally across from the minuend which would represent the difference between the two digits. As in the addition sequence, when the subtrahend digit is greater than the minuend digit, it will be necessary to add in a borrow of one to the minuend digit before looking up the difference in the table. Either, the conventional or the payback method of subtraction, as prevously discussed, may be utilized to find the solutions.

Therefore, the advent of systems computation, utilizing hexadecimal addition and subtraction, has formulated a need for a rapid means of performing alphameric addition and subtraction functions without the use of complicated tables. What is required then, is a method for rapidly discerning the results of hexadecimal and other higher order addition and subtraction.

It is an object of the present invention to provide a method for alphameric mathematical computations.

It is another object of the present nvention to provide a method for hexadecimal addition and subtraction.

Still a further object of the present invention is to provide a method wherein the carrying operations experienced in alphameric mathematical computation of high order systems, in particular during hexadecimal addition and subtraction, may be provided through mechanical means.

With these and other objects in mind, the present invention may be more readily understood through referral to the accompanying drawings and following discussion:

SUMMARY OF THE INVENTION

The objects of the present invention are accomplished through the utilization of a method for determining the solution of alphameric mathematical computations. The utilization of the method is particularly acute wherein one or more alphameric indicators of an alphameric system are added or subtracted from each other and carrying operations are required to facilitate the alphameric solution. The improved mathematical method of the present invention comprises placing each of the alphameric systems on interconnecting scales wherein the alphameric indicators are positioned equidistant upon each scale in the system order, wherein the opposing indicators of each ordered system may be aligned. A carry scale is placed for the ordered system, having equidistantly positioned carrying indicators, so as to be aligned to oppose the indicators of the scales of the alphameric system and being positioned one scale length to the offset of the interconnecting scales. The exacting alignment of the scales of the system accomplishes the alphameric solution for the mathematical computation desired. It is preferred embodiment of the present invention that the method for determining the solution of alphameric mathematical computations be directed to the hexadecimal alphameric systems wherein the scales are positioned in linear alignment.

BRIEF DESCRIPTION OF THE DRAWINGS

The present invention may be more readily understood by referring to the accompanying figures, in which.

DETAILED DESCRIPTION OF THE INVENTION

The present invention provides a method for the rapid computation of alphameric addition and subtraction and has a further provision for accounting for the carry associated with computations with alphameric systems. The carry is an inherent part of hexadecimal and other higher order alphameric systems and is developed during the subtraction and addition solutions. The carry not being readily accomplished by tabular and other form methods.

Figure 1:
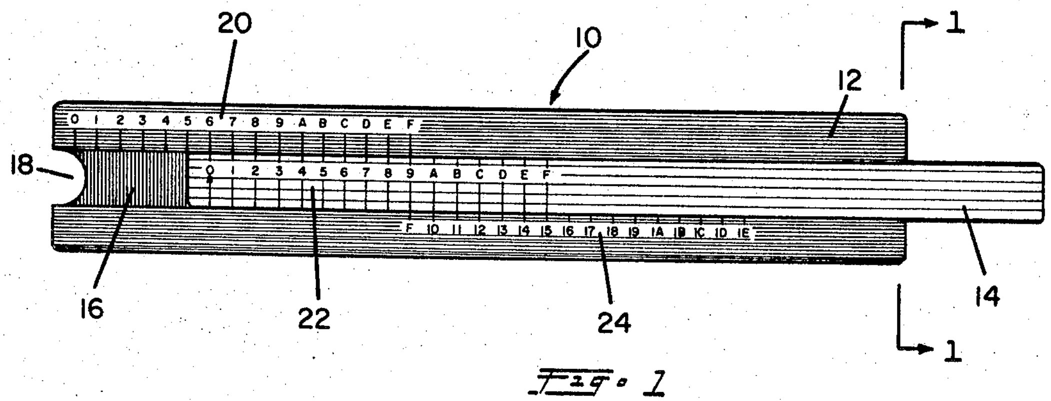
FIG. 1 represents a top view of a mechanical slide rule type apparatus having depicted thereon a hexadecimal scale in the particular linear alignment as disclosed herein for the accomplishment of the method of the present invention.

The particular aspects of the methods of the present invention are most readily provided by referral to the accompanying figures. FIG. 1 represents a top view of a slide rule form of a mechanism having positioned thereon interconnecting scales of alphameric indicators in equidistant positions upon the sliding mechanism. Slide rule 10 is depicted formed of a main body 12 having sliding arm 14 interconnected therewith. A first scale 20 is provided having alphameric indicators of the hexadecimal systems with the numbers 0 through 9 and the letters A, B, C, D, E, and F thereon. A second alphameric scale 22 of the numbers 0 through 9 and the letters A, B, C, D, E, and F are positioned thereon sliding member 14 having equidistant positioning of the system indicators upon the scale 22 in position such that the opposing indicators of scale 20 may be aligned when the sliding member 14 is positioned completely within main member 12. Still a third scale 24 representing the carry indicators of the hexadecimal system with the numbers 10 through 19 and the alphameric system indicators 1A, 1B, 1C, 1D, and 1E is shown. The indicators or scale 24 are equidistantly positioned upon the lower portion of main member 12 so as to be aligned with the indicator scale 22 of sliding member 14 and having the carry system indicators of scale 24 equidistantly disposed so as to adequately align themselves with the system indicators of scale 22 when sliding member 14 is aligned therewith main member 12.

For ease in operation of the slide rule mechanism an index indentation 18 is provided within main member 12 for finger placement and ease of control of sliding member 14. It is realized that the mechanical reduction to practice of the method of the present invention being only one embodiment of the means which may be utilized for accomplishing the method disclosed herein, this apparatus more readily depicts a form of a mechanical application of the linear sliding scales taking the form of a slide rule 10 as depicted.

Figure 2:
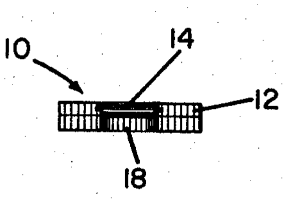
FIG. 2 represents an end view taken along line 1, 1 of FIG. 1 of the mechanical apparatus for utilization in conjunction with the method of the present invention.

The slide rule 10 is shown in an end view in FIG. 2 as taken along line 1, 1 of FIG. 1. The slide rule 10 is depicted having a main member 12 with interconnected sliding arm 14 contained therein and illustrates the index indentation 18 contained upon each end of the main body 12.

To more readily depict the operation of the mechanical device disclosed in FIGS. 1 and 2 and the utilization of mechanical apparatus for accomplishment of the method of the present invention, the following examples of hexadecimal addition and subtraction operations are illustrated:

Example I

With the addition of the numbers 9,654 to 4,528 one would place the zero indice of scale 22 upon the numeral 4 of scale 20, traverse scale 22 and look to the answer on scale 20, above the 8, of C to determine the alphameric position. In similar fashion the 5 is indicated by the zero indicator on scale 22 to show an answer of 7, above the 2 on the scale 20. Also the 5 is positioned at the zero indicator of scale 22 and one traverses to the 6 on scale 22 to show an answer of B on scale 20. Similarly the zero indicator is placed upon scale 20 at position 4 to give the results of D on the scale 20 for the 9 indicator of scale 22, for answer of DB7C.

9,654
4,528
———
DB7C

Example II

In another example of usage showing the carry aspects of the method of the present invention, the zero indicator of scale 22 is placed upon the letter E of scale 20, one traverses scale 22 to letter A of scale 22 and looks to the carry scale 24 to find an answer of 18 showing a carry of 1.

E
A
—
18

Example III

The following operations are depicted with the manipulation of the scale being utilized in order to provide the answers with the carries being shown above the two alphameric systems being added:

(1)(1)
6 A E
1 F A
———
8 A 8

(1)(1)
8 F 9 7
D 4 4 C
————
1 6 3 E 3

Example IV

An example of hexadecimal subtraction follows the same rules as decimal and binary subtraction with the provision that a carry or borrow of 1 in hexadecimal notation represents the indicator 16. To obtain a difference of two hexadecimal digits the following example is given. When the subtrahend digit is greater than the minuend digit, it is necessary, of course, to add in a carry of 1 to the minuend digit before looking for the new value on the slide rule. For the subtraction of 1FA from 8A8 one finds that A cannot be subtracted from 8 since it exceeds 8 hence a one is borrowed from the next higher order of digits at the left of A reducing the digit to 9, since A minus 1 equals 9 and increasing the minuend digit to 18. To carry out the subtraction 18 minus A, one places A of the scale 22 on 18 of the scale 24 and reads to the left and up to find an answer of E. In similar fashion F from A is found to be A and 1 from 8 is found to be 7.

$$\begin{array}{r} 8\ A\ 8 \\ -1\ F\ A \\ \hline 6\ A\ E \end{array}$$

Therefore, all the operations of hexadecimal addition and subtraction may be easily provided through provisions of the three scales on a common linear form of slide rule. The slide rule provides a means for accomplishing all the manipulations of any hexadecimal addition or subtraction or combination solutions, for other alphameric systems since carries may be provided for allowing exacting solutions without the necessity of memorizing or recording certain portions of the solution during the operation as is required with tabular solutions.

As depicted in the accompanying figures, a preferred embodiment of the present invention is the utilization of three scales in a linear sequence, for example, the slide rule. Radial applications of the apparatus of the present invention may be provided but require three radial scales being positioned so as to adapt themselves to the sequence of addition or subtraction. This mode of operation is more readily provided by the horizontal scale slution then by radial techniques. Also as depicted, equidistant positioning of the numbers and letters of the alphameric scale is favored as it provides for a simple linear relationship of the scales for the carrying and straight addition and subtraction operations. It has also been found that other systems of higher than decimal order, including pentadecimal, hepadecimal, octadecimal systems may be easily provided for by use of the apparatus as disclosed herein. It being known that the lower order computer languages prefer octadecimal, wherein higher order sixteen bite computer operations utilize the hexadecimal system as preferred and shown in the embodiment herein.

Therefore, through utilization of the method of the present invention one is provided with a method for the rapid computational addition or subtraction of alphameric mathematical operations. The method provides for carry operations inherent in, for example, hexadecimal addition and subtraction solutions. Therefore, the present invention provides a method wherein hexadecimal systems may be utilized with the simplicity of decimal and binary addition techniques for accomplishment of addition, subtraction and carrying operations.

While the present invention has been described herein with the particular embodiments thereof, it will be appreciated by those skilled in the art that various changes and modifications may be made without departing from the scope and spirit of the present invention.

Therefore I claim:

1. In a method for determining the solution of alphameric mathematical computations wherein one or more alphameric indicators of an alphameric system are added or subtracted from each other and carrying operations are required to facilitate the alphameric solution, the improvement which comprises:
   (a) placing each of the alphameric systems on interconnecting scales wherein the alphameric indicators are positioned equidistant upon each scale in the order of the system, wherein the opposing indicators of each ordered system may be aligned;
   (b) placing the carry scale for the ordered system, having equidistantly positioned carry indicators thereon, which may be aligned so as to oppose the indicators of the scales of step (a), which is positioned one scale length to the offset of the interconnecting scales; and
   (c) aligning the scales of the system to denote the solution of the alphameric operation.
2. The method of claim 1 wherein the alphameric system is hexadecimal.
3. The method of claim 2 wherein the scales are placed in linear alignment.

References Cited

UNITED STATES PATENTS

| | | | |
|---|---|---|---|
| 3,604,620 | 9/1971 | Rakes | 235—69 |
| 3,654,438 | 4/1972 | Wyatt et al. | 235—84 |
| 3,654,437 | 4/1972 | Wyatt et al. | 235—84 |
| 3,670,958 | 6/1972 | Radosavljevic | 235—70 A |

RICHARD B. WILKINSON, Primary Examiner

S. A. WAL, Assistant Examiner